US011348119B1

(12) United States Patent
Brennan et al.

(10) Patent No.: US 11,348,119 B1
(45) Date of Patent: May 31, 2022

(54) INTELLIGENT MERCHANT ONBOARDING

(71) Applicant: Block, Inc., San Francisco, CA (US)

(72) Inventors: Katherine Brennan, Oakland, CA (US); Bruce Bell, New York, NY (US); Brian Stegall, San Francisco, CA (US); Matthew O'Connor, New York, NY (US); Timothy Donnelly, San Francisco, CA (US); Jared Travis Marr, Brookhaven, GA (US); Christopher Cosgrove, San Francisco, CA (US); Edward Ruder, San Jose, CA (US); Allyson Schrader, San Francisco, CA (US)

(73) Assignee: Block, Inc., San Francisco, CA (US)

( * ) Notice: Subject to any disclaimer, the term of this patent is extended or adjusted under 35 U.S.C. 154(b) by 344 days.

(21) Appl. No.: 15/787,519

(22) Filed: Oct. 18, 2017

(51) Int. Cl.
*G06Q 30/00* (2012.01)
*G06Q 30/06* (2012.01)
*G06Q 10/10* (2012.01)
*G06Q 10/08* (2012.01)

(52) U.S. Cl.
CPC ........... *G06Q 30/018* (2013.01); *G06Q 10/08* (2013.01); *G06Q 10/105* (2013.01); *G06Q 30/0609* (2013.01); *G06Q 30/0623* (2013.01)

(58) Field of Classification Search
CPC .... G06Q 30/018; G06Q 10/08; G06Q 10/105; G06Q 30/0609; G06Q 30/0623
See application file for complete search history.

(56) References Cited

U.S. PATENT DOCUMENTS

| 6,564,213 | B1 | 5/2003 | Ortega et al. |
| 6,910,017 | B1 | 6/2005 | Woo et al. |
| 7,254,774 | B2 | 8/2007 | Cucerzan et al. |
| 7,447,678 | B2 | 11/2008 | Taylor et al. |

(Continued)

OTHER PUBLICATIONS

Tueffel, H. (2016). Boost the bottom line with accounts payable best practices. Journal of Accountancy, 222(5), 50-54. Retrieved from https://search.proquest.com/trade-journals/boost-bottom-line-with-accounts-payable-best/docview/1837894269/se-27accountid=14753 (Year: 2016).*

(Continued)

*Primary Examiner* — Carrie S Gilkey
(74) *Attorney, Agent, or Firm* — Lee & Hayes, P.C.

(57) ABSTRACT

Intelligent merchant onboarding is described. A service provider can determine first directive(s) that were presented to one or more first potential merchants that completed an onboarding process with the service provider and second directive(s) that were presented to one or more second potential merchants that did not complete the onboarding process. The service provider can train a data model based at least partly on the first directive(s) or the second directive(s). Based at least partly on receiving an indication that a potential merchant initiates the onboarding process, the service provider can determine information associated with the potential merchant. Based at least partly on the data model and the information, the service provider can intelligently determine an order that one or more directives are to be presented to the potential merchant such that a first directive of the first directive(s) is presented prior to a second directive of the second directive(s).

20 Claims, 7 Drawing Sheets

(56) References Cited

U.S. PATENT DOCUMENTS

| | | | |
|---|---|---|---|
| 7,610,233 B1 | 10/2009 | Leong et al. | |
| 7,831,584 B2 | 11/2010 | Rothman | |
| 7,958,066 B2* | 6/2011 | Pinckney | G06N 20/00 |
| | | | 706/12 |
| 8,571,985 B1 | 10/2013 | Grigg et al. | |
| 9,741,030 B2 | 8/2017 | Tavares | |
| 9,836,743 B2 | 12/2017 | Celikyilmaz et al. | |
| 10,269,077 B2 | 4/2019 | Celikyilmaz et al. | |
| 10,304,056 B1 | 5/2019 | Izenson et al. | |
| 10,740,852 B1 | 8/2020 | George et al. | |
| 10,949,825 B1 | 3/2021 | Brosamer et al. | |
| 2002/0107746 A1 | 8/2002 | Jacoby, Jr. | |
| 2005/0004889 A1 | 1/2005 | Bailey et al. | |
| 2005/0102202 A1 | 5/2005 | Linden et al. | |
| 2005/0120006 A1 | 6/2005 | Nye | |
| 2006/0095370 A1 | 5/2006 | Seth et al. | |
| 2008/0040323 A1 | 2/2008 | Joshi | |
| 2008/0270275 A1 | 10/2008 | McElroy et al. | |
| 2009/0276522 A1 | 11/2009 | Seidel | |
| 2010/0023311 A1 | 1/2010 | Subrahmanian et al. | |
| 2010/0057786 A1 | 3/2010 | Hardy-Mcgee | |
| 2010/0106652 A1 | 4/2010 | Sandholm et al. | |
| 2011/0178849 A1 | 7/2011 | Rane et al. | |
| 2011/0295759 A1* | 12/2011 | Selvakummar | G06Q 10/1053 |
| | | | 705/321 |
| 2012/0290422 A1 | 11/2012 | Bhinder | |
| 2013/0073342 A1 | 3/2013 | Crump et al. | |
| 2013/0173320 A1 | 7/2013 | Bank et al. | |
| 2013/0231976 A1 | 9/2013 | Tavares et al. | |
| 2014/0012704 A1 | 1/2014 | Mizhen et al. | |
| 2014/0114812 A1 | 4/2014 | Rothman | |
| 2015/0220958 A1 | 8/2015 | Tietzen et al. | |
| 2017/0344656 A1* | 11/2017 | Koren | G06Q 10/101 |

OTHER PUBLICATIONS

Non-Final Office Action dated Feb. 2, 2010, for U.S. Appl. No. 11/963,592, of Rothman, S., filed Dec. 21, 2007.
Notice of Allowance dated Sep. 16, 2010, for U.S. Appl. No. 11/963,592, of Rothman, S., filed Dec. 21, 2007.
Non-Final Office Action dated Jan. 6, 2016, for U.S. Appl. No. 14/184,447, of Kim, M., et al., filed Feb. 19, 2014.
Final Office Action dated Oct. 11, 2016, for U.S. Appl. No. 14/184,447, of Kim, M., et al., filed Feb. 19, 2014.
Non-Final Office Action dated Mar. 20, 2017, for U.S. Appl. No. 14/184,447, of Kim, M., et al., filed Feb. 19, 2014.
Final Office Action dated Aug. 31, 2017, for U.S. Appl. No. 14/184,447, of Kim, M., et al., filed Feb. 19, 2014.
Non-Final Office Action dated Aug. 31, 2017, for U.S. Appl. No. 15/640,221, of Brosamer, J., et al., filed Jun. 30, 2017.
Non-Final Office Action dated Dec. 15, 2017, for U.S. Appl. No. 14/747,064, of George, M.R., et al., filed Jun. 23, 2015.
Final Office Action dated Feb. 1, 2018, for U.S. Appl. No. 15/640,221, of Brosamer, J., et al., filed Jun. 30, 2017.
Final Office Action dated Jul. 13, 2018, for U.S. Appl. No. 14/747,064, of George, M.R., et al., filed Jun. 23, 2015.
Non-Final Office Action dated Sep. 7, 2018, for U.S. Appl. No. 15/640,221, of Brosamer, J., et al. filed Jun. 30, 2017.
Advisory Action dated Oct. 16, 2018, for U.S. Appl. No. 14/747,064, of George, M.R., et al., filed Jun. 23, 2015.
Final Office Action dated Mar. 7, 2019, for U.S. Appl. No. 15/640,221 of Brosamer, J., et al., filed Jun. 30, 2017.
Advisory Action dated May 14, 2019, for U.S. Appl. No. 15/640,221, of Brosamer, J., et al., filed Jun. 30, 2017.
Non-Final Office Action dated May 28, 2019, for U.S. Appl. No. 14/747,064, of George, M.R., et al., filed Jun. 23, 2015.
Non-Final Office Action dated Jun. 27, 2019, for U.S. Appl. No. 15/640,221, of Brosamer, J., et al., filed Jun. 30, 2017.
Final Office Action dated Dec. 12, 2019, for U.S. Appl. No. 14/747,064, of George, M.R., et al., filed Jun. 23, 2015.
Final Office Action dated Jan. 8, 2020, for U.S. Appl. No. 15/640,221, of Brosamer, J., et al., filed Jun. 30, 2017.
Advisory Action dated Mar. 19, 2020, for U.S. Appl. No. 15/640,221, of Brosamer, J., et al., filed Jun. 30, 2017.
Notice of Allowance dated Apr. 3, 2020, for U.S. Appl. No. 14/747,064, of George, M.R., et al., filed Jun. 23, 2015.
Notice of Allowance dated Sep. 2, 2020, for U.S. Appl. No. 15/640,221, of Brosamer, J., et al., filed Jun. 30, 2017.
Behera et al., "Credit Card Fraud Detection: A Hybrid Approach Using Fuzzy Clustering & Neural Network", Second International Conference on Advances in Computing and Communication Engineering, 2015, pp. 494-499.
Notice of Allowance dated Dec. 15, 2020, for U.S. Appl. No. 15/640,221, of Brosamer, J., et al., filed Jun. 30, 2017.
Corrected Notice of Allowability dated Jan. 6, 2021, for U.S. Appl. No. 15/640,221, of Brosamer, J., et al., filed Jun. 30, 2017.

* cited by examiner

INTELLIGENT MERCHANT ONBOARDING

BACKGROUND

Onboarding processes for registering potential merchants with a service provider are laborious and time consuming. Current onboarding technologies require potential merchants to answer multiple questions, thereby requiring multiple interactions between the potential merchants and the service provider, before the potential merchants have access to any meaningful use of services provided by the service provider. Accordingly, potential merchants often become frustrated or lose interest during onboarding processes and end up withdrawing from the onboarding processes.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
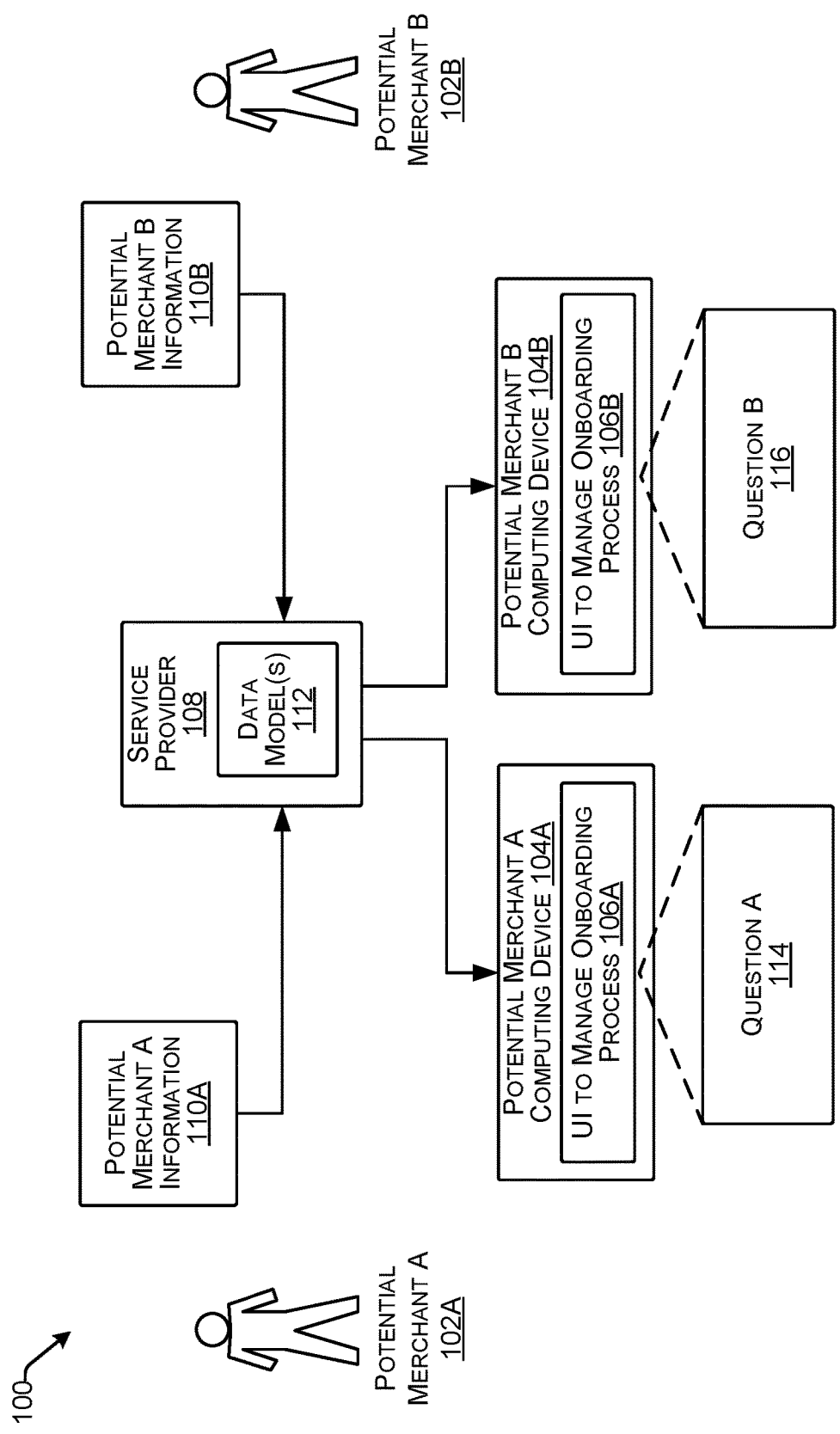
FIG. 1 illustrates an example process for providing intelligent onboarding processes for different potential merchants according to some implementations.

Techniques described herein are directed to intelligent merchant onboarding. For the purpose of this discussion, a merchant can be any entity that offers items (e.g., goods or services) for sale. In at least one example, a service provider can provide payment processing services, as well as various other services, to merchants. For instance, the service provider can provide payroll services, inventory management services, employee management services, financing services, appointment services, etc. for merchants. In some examples, different merchants have different intended uses for using services of the service provider. For instance, in some examples, a first potential merchant can intend to use the service provider only for processing payments and a second potential merchant can intend to use the service provider for processing payments, managing inventory, and paying payroll.

For the purpose of this discussion, onboarding can refer to registering a potential merchant with a service provider. In some examples, onboarding can involve presenting various questions, prompts, and the like (collectively, directives) to a potential merchant to obtain merchant information that can be used to generate a merchant profile for the potential merchant. Responsive to the potential merchant providing all necessary merchant information, the potential merchant can be onboarded to the service provider as a merchant. That is, for the purpose of this discussion, prior to a successful onboard, an interested entity can be called a potential merchant, and after a successful onboard, such an entity can be called a merchant.

Currently, processes for onboarding a potential merchant onto the service provider require potential merchants to answer the same questions and/or otherwise present the same directives to all potential merchants, regardless of their intended use of the service provider. That is, current onboarding techniques are the same for all potential merchants onboarding to the service provider. For instance, the first potential merchant and the second potential merchant, described above, can be required to answer the same questions, input the same information, etc. without regard to their different intended purposes. As described above, such onboarding processes are time consuming and can lead to frustration for potential merchants trying to register with the service provider. Furthermore, such onboarding processes can cause potential merchants to withdraw from the onboarding process prior to successfully completing the onboarding process.

Techniques described herein are directed to leveraging information associated with potential merchants and machine learning mechanisms to intelligently generate onboarding experiences that are tailored for the potential merchants. For instance, in at least one example, techniques described herein can intelligently determine which questions to ask particular potential merchants, which can amount to presenting fewer, more relevant questions to potential merchants. Furthermore, techniques described herein can intelligently determine an order for presenting questions associated with the onboarding process to ensure that the questions that drive successful onboarding are surfaced to a potential merchant before questions that are known to cause potential merchants to withdraw from the onboarding process. For instance, questions that are important, relevant, and/or less difficult to answer can be surfaced to potential merchants before questions that are less important, irrelevant, and/or are difficult to answer are surfaced to the potential merchants.

As a non-limiting example, assume a potential merchant runs a restaurant business. The potential merchant can interact with a user interface (e.g., web browser, application, etc.) that facilitates an onboarding process for a service provider to initiate the onboarding process. In some examples, the potential merchant can provide some sort of identification data (e.g., a name of the restaurant, a location, an email address, etc.), which can be used to initiate the onboarding process. The service provider can determine information associated with the potential merchant (e.g., location(s) of the restaurant(s), menu item(s), whether the potential merchant has employees, etc.). Using the information, the service provider can determine an intent of the potential merchant, based on how other potential merchants that run restaurant businesses have used services offered by the service provider. For instance, the service provider can determine that the potential merchant intends to use the service provider for payment processing services and reservation services, based on how other potential merchants that run restaurant businesses have used services offered by the service provider.

Accordingly, the service provider can determine the information needed from the potential merchant to enable the potential merchant to onboard with the service provider and access payment processing services and reservation services. For instance, the service provider can request account information for identifying an account into which funds generated from payments processed by the service provider are to be deposited and hours of operation, a number of tables, etc. that can be used for generating a reservation schedule. The service provider can surface directives that prompt the potential merchant to provide such information prior to surfacing other directives that are less important to onboarding a potential merchant for using payment processing services and reservation services. As soon as the service provider has the information required to onboard a potential merchant for using payment processing services and reservation services, the service provider can onboard the potential merchant and can provide the onboarded merchant with access to the payment processing services and reservation services. As such, the potential merchant can meaningfully engage with the service provider with minimal friction and minimal time. That is, directives that solicit information that is relevant to payroll services or inventory management services can be presented at a later time to enable the potential merchant to be onboarded as efficiently as possible.

Accordingly, techniques described herein can provide improvements to onboarding processes, which can decrease the amount of time and the number of interactions required to register a potential merchant with a service provider. Moreover, techniques described herein can reduce errors experienced during onboarding processes. Furthermore, techniques described herein can reduce the number of potential merchants that withdraw from the onboarding process, thereby increasing the rate at which potential merchants are converted to merchants.

FIG. 1 illustrates an example environment 100 for providing intelligent onboarding processes for different potential merchants according to some implementations. Environment 100 includes two potential merchants: potential merchant A 102A and potential merchant B 102B (collectively, potential merchants 102). Two potential merchants 102 are shown for ease of illustration; however, environment 100 can include any number of potential merchants. Each potential merchant 102A, 102B can operate a computing device. For instance, potential merchant A 102A can operate a potential merchant computing device 104A and potential merchant B 102B can operate a potential merchant computing device 104B (collectively, potential merchant computing devices 104). Each potential merchant computing device 104A, 104B can be associated with a user interface (UI) to manage an onboarding process. For instance, the potential merchant A computing device 104A can include a UI to manage an onboarding process 106A and the potential merchant B computing device 104B can include a UI to manage an onboarding process 106B.

In some examples, the UI to manage an onboarding process 106A can be presented via a web browser, or the like, that enables the prospective merchant A 102A to access and manage the onboarding process. In other examples, the UI to manage an onboarding process 106A can be presented via an application, such as a mobile application or desktop application, which is provided by a service provider 108, or which can be an otherwise dedicated application. Similarly, the UI to manage an onboarding process 106B can be presented via a web browser, an application, etc.

In at least one example, a service provider 108 can provide various services, such as, but not limited to payment processing services, payroll services, inventory management services, employee management services, financing services, and appointment services. One or more service computing devices can perform one or more actions on behalf of the service provider 108, as described below with reference to FIG. 2. In at least one example, the service provider 108 can receive merchant information associated with potential merchant A 102A (e.g., potential merchant A information 110A) and merchant information associated with potential merchant B 102B (e.g., potential merchant B information 110B).

Merchant information can include information associated with a potential merchant. For instance, merchant information can include, but is not limited to, a merchant category code (MCC), item(s) offered for sale by the potential merchant, transaction data associated with transactions conducted by the potential merchant, hardware (e.g., device type) used by the potential merchant, location data identifying location(s) associated with the potential merchant, employment data indicating whether the potential merchant employs employee(s) and/or identities of employee(s) employed by the potential merchant, etc. Merchant information can further include information about hardware used by a potential merchant and/or software used by a potential merchant. Furthermore, in some examples, merchant information can include information about how a potential merchant accessed the onboarding process (e.g., from a search results webpage, from a website associated with the service provider, etc.). Additional and/or alternative merchant information can be imagined.

The service provider 108 can train and store data model(s) 112. In at least one example, the data model(s) 112 can be trained utilizing machine learning mechanisms. In at least one example, the service provider 108 can determine descriptive data indicative of information about a plurality of potential merchants (e.g., merchant information) and onboarding data indicative of interactions between the plurality of potential merchants and the service provider 108 during an onboarding process for registering with the service provider 108. The service provider 108 can utilize a machine learning mechanism to train the data model(s) 112 based at least in part on one or more trends associated with the onboarding process represented by the descriptive data and the onboarding data. In such an example, the data model(s) 112 can be trained using supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc. Additional details associated with training the data model(s) 112 are described below with reference to FIGS. 2-4.

Based at least in part on receiving potential merchant A information 110A the service provider 108 can utilize the data model(s) 112 to determine a user experience for onboarding the potential merchant A 102A. That is, the service provider 108 can analyze the potential merchant A information 110A with the data model(s) 112 to determine a user experience that is most relevant to the potential merchant A 102A. As a result, the service provider 108 can determine a plurality of questions that are to be presented to the potential merchant A 102A via the UI to manage onboarding process 106A, an order for presenting the plurality of questions, a timing for presenting the plurality of questions, and/or a graphical presentation for presenting the plurality of questions. Based at last in part on determining a user experience for the potential merchant A 102A, the service provider 108 can send at least a first question (e.g., Question A 114) to the potential merchant A computing device 104A. The UI to manage onboarding process 106A can present the first question (e.g., Question A 114) to the potential merchant A 102A. In at least one example, the first question (e.g., Question A 114) can be determined to be likely to lead to a successful onboard based on the intention of the potential merchant A 102A. Questions less likely to lead to a successful onboard (or likely to lead to a withdrawal from the onboarding process) can be omitted from the onboarding process, or presented at a later time during the onboarding process. While FIG. 1 refers to questions, as described above, the service provider 108 can determine a user experience for the potential merchant A 102A that includes any type of directive.

Based at least in part on receiving potential merchant B information 110B the service provider 108 can utilize the data model(s) 112 to determine a user experience for onboarding the potential merchant B 102B. That is, the service provider 108 can analyze the potential merchant B information 110B with the data model(s) 112 to determine a user experience that is most relevant to the potential merchant B 102B. In at least one example, the potential merchant A 102A and the potential merchant B 102B can have different intentions for using services offered by the service provider 108 and accordingly, the user experiences for the potential merchant A 102A and the potential merchant B 102B can be different.

Based at least in part on determining a user experience for onboarding the potential merchant B 102B, the service provider 108 can determine a plurality of questions that are to be presented to the potential merchant B 102B via the UI to manage onboarding process 106B, an order for presenting the plurality of questions, a timing for presenting the plurality of questions, and/or a graphical presentation for presenting the plurality of questions. Based at last in part on determining a user experience for the potential merchant B 102B, the service provider 108 can send at least a first question (e.g., Question B 116) to the potential merchant B computing device 104B. The UI to manage onboarding process 106B can present the first question (e.g., Question B 116) to the potential merchant B 102B. In at least one example, the first question (e.g., Question A 114) presented to the potential merchant A 102A can be different than the first question (e.g., Question B 116) presented to the potential merchant B 102B. In at least one example, the first question (e.g., Question B 116) can be determined to be likely to lead to a successful onboard based on the intention of the potential merchant B 102B. Questions less likely to lead to a successful onboard (or likely to lead to a withdrawal from the onboarding process) can be omitted from the onboarding process, or presented at a later time during the onboarding process. While FIG. 1 refers to questions, as described above, the service provider 108 can determine a user experience for the potential merchant B 102B that includes any type of directive.

As illustrated in FIG. 1, techniques described herein are directed to leveraging information associated with potential merchants and machine learning mechanisms to intelligently generate onboarding experiences that are tailored for the particular merchants. That is, the potential merchant A information 110A is utilized by the service provider 108 to determine which questions to present to the potential merchant A 102A and the potential merchant B information 110B is utilized by the service provider 108 to determine which questions to present to the potential merchant B 102B.

As described above, techniques illustrated in FIG. 1 can amount to presenting fewer, more relevant questions to potential merchants. Accordingly, such techniques can provide improvements to the onboarding process, which can decrease the amount of time and the number of interactions required to register a potential merchant (e.g., potential merchant A 102A and/or potential merchant B 102B) with the service provider 108. Furthermore, techniques described herein can reduce the number of potential merchants that withdraw from the onboarding process, thereby increasing the rate at which potential merchants are converted to merchants.

Figure 2:
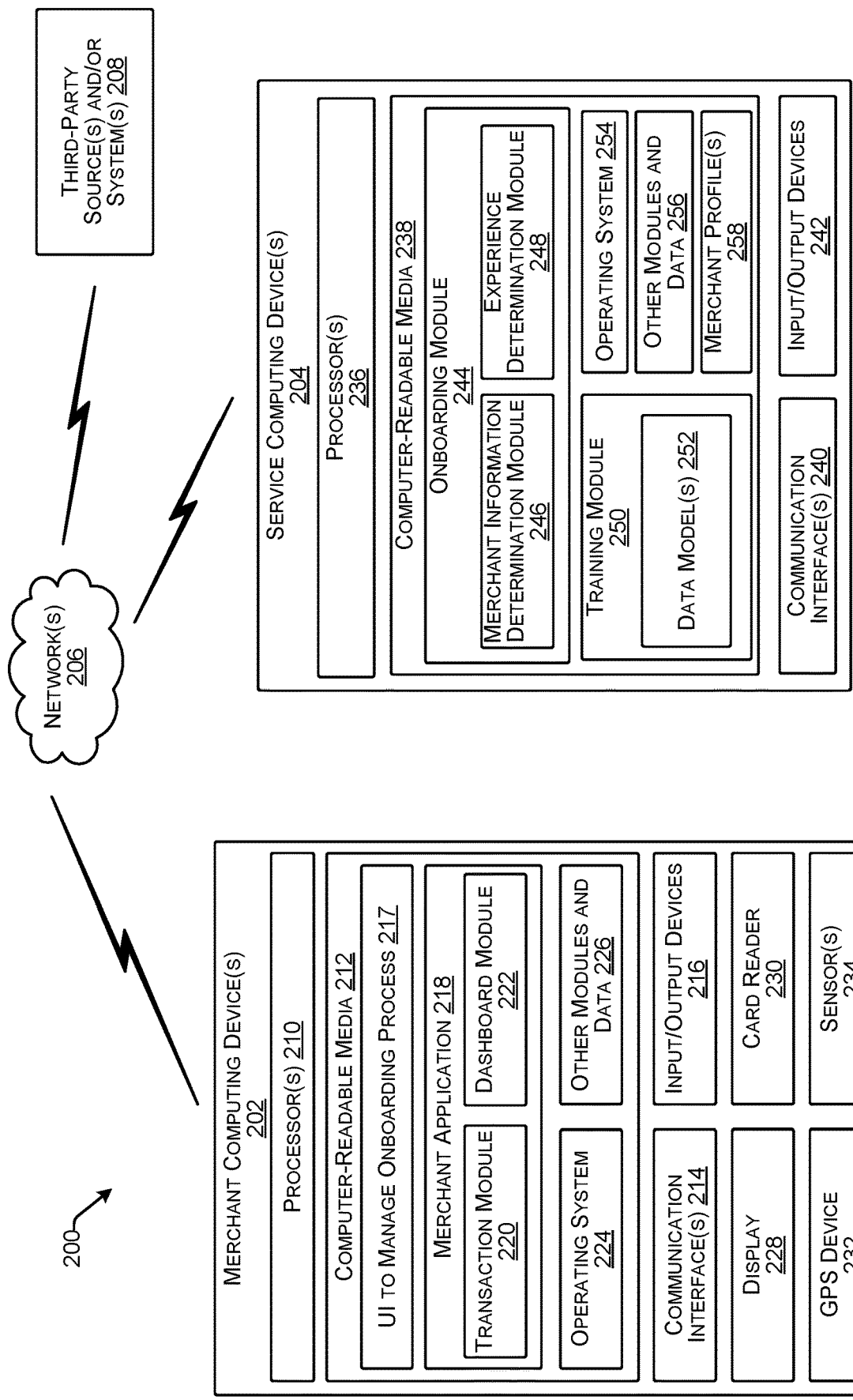
FIG. 2 illustrates an example environment for providing intelligent onboarding processes for different potential merchants according to some implementations.

FIG. 2 illustrates an example environment 200 for providing intelligent onboarding processes for different potential merchants according to some implementations. The environment 200 can include one or more merchant computing devices 202, which can communicate with one or more service computing devices 204 via one or more networks 206. In at least one example, the merchant computing device(s) 202 and/or the service computing device(s) 204 can also communicate with third-party source(s) and/or system(s) 208 via the network(s) 206.

A potential merchant (not shown in FIG. 2) can operate a merchant computing device of the merchant computing device(s) 202. In at least one example, the merchant computing device(s) 202 can be any suitable type of computing device, e.g., portable, semi-portable, semi-stationary, or stationary. Some examples of the merchant computing device(s) 202 can include tablet computing devices; smart phones and mobile communication devices; laptops, netbooks and other portable computers or semi-portable computers; desktop computing devices, terminal computing devices and other semi-stationary or stationary computing devices; dedicated register devices; wearable computing devices, or other body-mounted computing devices; augmented reality devices; or other computing devices capable of sending communications and performing the functions according to the techniques described herein. Potential merchant computing devices 104 as described above with reference to FIG. 1 can correspond to the merchant computing device(s) 202.

In the illustrated example, the merchant computing device(s) 202 include one or more processors 210, one or more computer-readable media 212, one or more communication interfaces 214, and one or more input/output (I/O) devices 216. Each processor 210 can itself comprise one or more processors or processing cores. For example, the processor(s) 210 can be implemented as one or more microprocessors, microcomputers, microcontrollers, digital signal processors, central processing units, state machines, logic circuitries, and/or any devices that manipulate signals based on operational instructions. In some examples, the processor(s) 210 can be one or more hardware processors and/or logic circuits of any suitable type specifically programmed or configured to execute the algorithms and processes described herein. The processor(s) 210 can be configured to fetch and execute computer-readable processor-executable instructions stored in the computer-readable media 212.

Depending on the configuration of the merchant computing device(s) 202, the computer-readable media 212 can be an example of tangible non-transitory computer storage media and can include volatile and nonvolatile memory and/or removable and non-removable media implemented in any type of technology for storage of information such as computer-readable processor-executable instructions, data structures, program modules or other data. The computer-readable media 212 can include, but is not limited to, RAM, ROM, EEPROM, flash memory, solid-state storage, magnetic disk storage, optical storage, and/or other computer-readable media technology. Further, in some examples, the merchant computing device(s) 202 can access external storage, such as RAID storage systems, storage arrays, network attached storage, storage area networks, cloud storage, or any other medium that can be used to store information and that can be accessed by the processor(s) 210 directly or through another computing device or network. Accordingly, the computer-readable media 212 can be computer storage media able to store instructions, modules or components that can be executed by the processor(s) 210. Further, when mentioned, non-transitory computer-readable media exclude media such as energy, carrier signals, electromagnetic waves, and signals per se.

The computer-readable media 212 can be used to store and maintain any number of functional components that are executable by the processor(s) 210. In some implementations, these functional components comprise instructions or programs that are executable by the processor(s) 210 and that, when executed, implement operational logic for performing the actions and services attributed above to the merchant computing device(s) 202. Functional components stored in the computer-readable media 212 can include a UI to manage an onboarding process 217 and a merchant application 218, which can include a transaction module 220 and a dashboard module 222.

As described above with reference to FIG. 1, the merchant computing device(s) 202 can include an instance of a UI to manage the onboarding process 217 (e.g., 106A, 106B with reference to FIG. 1). In at least one example, the UI to manage the onboarding process 217 can be presented via a web browser, or the like, that enables a prospective merchant to access and manage an onboarding process. In other examples, the UI to manage the onboarding process 217 can be presented via an application, such as a mobile application or desktop application, which is provided by the service provider, or which can be an otherwise dedicated application.

In at least one example, the UI to manage the onboarding process 217 can present graphical user interface(s) that prompt a potential merchant to input information that can be used to register the potential merchant with the service provider. For instance, as described herein, the service computing device(s) 204 can determine user experiences that are tailored for particular potential merchants. In at least one example, the service computing device(s) 204 can send instructions to the UI to manage the onboarding process 217. The instructions can identify one or more directives (e.g., questions, prompts, etc.) that are to be presented to a potential merchant, an order for presenting the directive(s), a timing for presenting the directive(s), and/or a graphical design for presenting the directive(s). The UI to manage the onboarding process 217 can implement the instructions for providing a personalized user experience to a potential merchant.

In some examples, the service computing device(s) 204 can send instructions for a single directive that is to be presented to a potential merchant. The UI to manage the onboarding process 217 can present the single directive and can determine context data associated with how the potential merchant interacts with the directive. For instance, the UI to manage the onboarding process 217 can determine that the potential merchant did not interact with the directive for a particular duration of time (e.g., indicating that the potential merchant was confused or hesitated to provide requested information), that the potential merchant attempted to pass on interacting with the directive, etc. Or, the UI to manage the onboarding process 217 can track interactions with the UI (e.g., clicks, taps, etc.) and/or page views and can generate context data based on such information. In such examples, the UI to manage the onboarding process 217 can send context data to the service computing device(s) 204 to enable the service computing device(s) 204 to leverage the context data for intelligently selecting a subsequent directive that is to be presented to the potential merchant.

As described above, a directive can include a question, a prompt, etc. that can solicit information from a potential merchant. In at least one example, a directive can solicit identification data associated with the potential merchant. For instance, such a directive can prompt the potential merchant to provide a business name, a business address, a website for a business, an email address associated with a business, a logo used to identify a business, etc. Additionally and/or alternatively, a directive can solicit account information identifying an account where the potential merchant desires to have funds deposited for payments processed by the service provider. Or, a directive can solicit inventory information identifying item(s) that the potential merchant has in its inventory. In at least one example, the UI to manage the onboarding process 217 can send data corresponding to information received responsive to the directives to the service computing device(s) 204.

In at least one example, the merchant computing device(s) 202 can include an instance of a merchant application 218 that is executed on the merchant computing device(s) 202. In some examples, the merchant application 218 can be downloaded responsive to successfully onboarding a potential merchant. The merchant application 218 can provide point-of-sale (POS) functionality to the merchant computing device(s) 202 to enable the merchant to accept payments from one or more customers at a POS location. For example, the merchant can use the merchant computing device(s) 202 to accept payments through various different types of payment instruments, e.g., payment cards, electronic payment, cash or check, at the POS location from the one or more customers. In at least one example, the transaction module 220 can present various user interfaces to enable a merchant to conduct transactions, receive payments, and so forth. Further, the dashboard module 222 can enable the merchant to manage transactions, payments, and so forth.

Furthermore, the computer-readable media 212 can include additional functional components, such as an operating system 224 for controlling and managing various functions of the merchant computing device(s) 202 and for enabling basic user interactions. In addition, the computer-readable media 212 can also store data, data structures and the like, that are used by the functional components. Depending on the type of the merchant computing device(s) 202, the computer-readable media 212 can also optionally include other functional components and data, such as other modules and data 226, which can include programs, drivers, etc., and the data used or generated by the functional components. For instance, in some examples, the merchant computing device(s) 202 can include a payroll module, an inventory management module, an employee management module, a financing module, an appointment module, etc., which can facilitate payroll services, inventory management services, employee management services, financing services, appointment services, etc., respectively. In some examples, the payroll module, the inventory management module, the employee management module, the financing module, the appointment module, etc., can be downloaded responsive to successfully onboarding a potential merchant.

Further, the merchant computing device(s) 202 can include many other logical, programmatic and physical components, of which those described are merely examples that are related to the discussion herein.

The communication interface(s) 214 can include one or more interfaces and hardware components for enabling communication with various other devices, such as over the network(s) 206 or directly. For example, communication interface(s) 214 can enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

The merchant computing device(s) 202 can further include the one or more I/O devices 216. The I/O devices 216 can include speakers, a microphone, a camera, and various user controls (e.g., buttons, a joystick, a keyboard, a keypad, etc.), a haptic output device, and so forth.

In at least one example, merchant computing device(s) 202 can include a display 228. Depending on the type of computing device(s) used as the merchant computing device(s) 202, the display 228 can employ any suitable display technology. For example, the display 228 can be a liquid crystal display, a plasma display, a light emitting diode display, an OLED (organic light-emitting diode) display, an electronic paper display, or any other suitable type of display able to present digital content thereon. In some examples, the display 228 can have a touch sensor associated with the display 228 to provide a touchscreen display configured to receive touch inputs for enabling interaction with a graphic interface presented on the display 228. Accordingly, implementations herein are not limited to any particular display technology. Alternatively, in some examples, the merchant computing device(s) 202 may not include the display 228, and information can be presented by other means, such as aurally.

In addition, the merchant computing device(s) 202 can include or can be connectable to a card reader 230. In some examples, the card reader 230 can plug in to a port in the merchant computing device(s) 202, such as a microphone/headphone port, a data port, or other suitable port. The card reader 230 can include a read head for reading a magnetic strip of a payment card, and further can include encryption technology for encrypting the information read from the magnetic strip. Alternatively, numerous other types of card readers can be employed with the merchant computing device(s) 202 herein, depending on the type and configuration of the merchant computing device(s) 202.

Other components included in the merchant computing device(s) 202 can include a GPS device 232 able to indicate location information. Further, the merchant computing device(s) 202 can include one or more sensors 234, such as an accelerometer, gyroscope, compass, proximity sensor, camera, microphone, and/or a switch, as discussed above. Additionally, the merchant computing device(s) 202 can include various other components that are not shown, examples of which include removable storage, a power source, such as a battery and power control unit, a barcode scanner, a printer, a cash drawer, and so forth.

As described above, techniques described herein are directed to onboarding potential merchants to a service provider such that the potential merchants can utilize services that are available from the service provider. In at least one example, the service provider can operate the service computing device(s) 204. The service computing device(s) 204 can include one or more servers or other types of computing devices that can be embodied in any number of ways. For example, in the example of a server, the modules, other functional components, and data can be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of the service computing device(s) 204 as being present in a single location, these components and data can alternatively be distributed across different computing devices and different locations in any manner. Consequently, the functions can be implemented by one or more service computing devices, with the various functionality described above distributed in various ways across the different computing devices. Multiple service computing device(s) 204 can be located together or separately, and organized, for example, as virtual servers, server banks and/or server farms. The described functionality can be provided by the servers of a single entity or enterprise, or can be provided by the servers and/or services of multiple different customers or enterprises.

In the illustrated example, the service computing device(s) 204 can include one or more processors 236, one or more computer-readable media 238, one or more communication interfaces 240, and one or more input/output devices 242. Each processor 236 can be a single processing unit or a number of processing units, and can include single or multiple computing units or multiple processing cores. The processor(s) 236 can be implemented as one or more microprocessors, microcomputers, microcontrollers, digital signal processors, central processing units, state machines, logic circuitries, and/or any devices that manipulate signals based on operational instructions. For example, the processor(s) 236 can be one or more hardware processors and/or logic circuits of any suitable type specifically programmed or configured to execute the algorithms and processes described herein. The processor(s) 236 can be configured to fetch and execute computer-readable instructions stored in the computer-readable media 238, which can program the processor(s) 236 to perform the functions described herein.

The computer-readable media 238 can include volatile and nonvolatile memory and/or removable and non-removable media implemented in any type of technology for storage of information, such as computer-readable instructions, data structures, program modules, or other data. Such computer-readable media 238 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the service computing device(s) 204, the computer-readable media 238 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 238 can be used to store any number of functional components that are executable by the processors 236. In many implementations, these functional components comprise instructions or programs that are executable by the processors 236 and that, when executed, specifically configure the one or more processors 236 to perform the actions attributed above to the service provider 108. Functional components stored in the computer-readable media 238 can include an onboarding module 244, which can include a merchant information determination module 246 and an experience determination module 248, and a training module 250.

The service computing device(s) 204 can include an instance of an onboarding module 244. The onboarding module 244 can be configured to facilitate an onboarding process for registering potential merchants with the service provider. In at least one example, the onboarding module 244 can receive an indication that a potential merchant initiates an onboarding process. In at least one example, the indication can correspond to identification data. The identification data can include one or more of a business name of a potential merchant, a phone number of a potential merchant, an email address of a potential merchant, a logo of a potential merchant, etc. In some examples, the indication can be received responsive to a directive presented via the UI to manage the onboarding process 217.

In at least one example, the service computing device(s) 204 can include an instance of a merchant information determination module 246. In at least one example, the merchant information determination module 246 can be configured to utilize the identification data to access merchant information associated with the potential merchant. For instance, the merchant information determination module 246 can send a query to the third-party source(s) and/or system(s) 208. The query can include at least some identification data. Based at least in part on sending the query to the third-party source(s) and/or system(s) 208, the third-party source(s) and/or system(s) 208 can send merchant information associated with the identification data back to the merchant information determination module 246.

As a non-limiting example, the merchant information determination module 246 can send a query including a business name of a potential merchant to the third-party source(s) and/or system(s) 208. Responsive to sending the query, the merchant information determination module 246 can receive merchant information including, but not limited to, a MCC of the potential merchant, item(s) offered for sale by the potential merchant, location(s) associated with the potential merchant, employment data indicating whether the potential merchant employs employee(s) and/or identities of employee(s) employed by the potential merchant, etc.

In some examples, the merchant information determination module 246 can send a query to the merchant computing device(s) 202 from which the merchant determination module 246 received the indication. The query can include a request for device-specific merchant information. For instance, such merchant information can include location data as determined by the GPS device 232, device identification information, hardware information, software versions running on the merchant computing device, etc. Based at least in part on sending the query to the merchant computing device(s) 202, the merchant computing device(s) 202 can send merchant information back to the merchant information determination module 246.

In some examples, merchant information can be associated with the indication that the potential merchant initiates an onboarding process. For instance, in some examples, the indication can include data identifying a computing location from which the potential merchant accessed the UI to manage the onboarding process 217. As a non-limiting example, the indication can include data identifying a search engine results page as the computing location from which the potential merchant accessed the UI to manage the onboarding process 217, or the indication can include data identifying a website associated with the service provider from which the potential merchant accessed the UI to manage the onboarding process 217. Additionally and/or alternatively, the indication can include data identifying a device (e.g., mobile, desktop, etc.) from which the indication was generated and/or an access point (e.g., web browser, application, etc.) from which the indication was generated.

In at least one example, at least some of the merchant information can be used to auto-populate individual directives. For instance, in a non-limiting example, a directive soliciting information about location(s) of businesses of the potential merchant can include identified location(s) of businesses of the potential merchant based on merchant information retrieved by the merchant information determination module 246. In such an example, the potential merchant can review the location(s) for accuracy and can update as needed, or can simply confirm that the location(s) are accurate.

In at least one example, the service computing device(s) 204 can include an instance of an experience determination module 248. The experience determination module 248 can be configured to intelligently determine user experiences for onboarding potential merchants. In at least one example, the experience determination module 248 can utilize one or more data models 252 trained by the training module 250 to determine a user experience for onboarding a particular potential merchant. For instance, the experience determination module 248 can access merchant information associated with a particular potential merchant and can leverage the data model(s) 252 to analyze the merchant information. Based at least in part on analyzing the merchant information, the data model(s) 252 can identify a user experience for onboarding the particular potential merchant.

As described above, the user experience can identify a plurality of directives that are to be presented to the potential merchant, an order for presenting the plurality of directives, a timing for presenting the plurality of directives, a graphical presentation for presenting the plurality of directives, etc. In at least one example, the user experience can cause directives that are likely to lead to a successful onboard to be presented before directives that are likely to cause potential merchants to withdraw from the onboarding process. That is, the user experience determination module 248 can cause directives that are most relevant to the potential merchant's intended use of service(s) offered by the service provider to be presented prior to directives that are less relevant to the potential merchant's intended use of service(s). Accordingly, potential merchants can provide information that is necessary to access particular service(s) without having to provide information that is not necessary to obtain prior to onboarding. Furthermore, in at least one example, particular user experiences can cause directives to be presented with particular graphical presentations that are relevant, or of particular interest, to a particular potential merchant.

In some examples, the user experience determination module 248 can identify a first directive to provide to a potential merchant. The user experience determination module 248 can receive context data indicating how the potential merchant responded and/or interacted with the first directive. Based at least in part on the context data, the user experience determination module 248 can determine a second directive to present to the potential merchant. That is, in some examples, the user experience determination module 248 can modify and/or update the user experience during the onboarding process.

The user experience determination module 248 can provide various customizations to enable a tailored experience for potential merchants (or merchants). For instance, the user experience determination module 248 can determine products (e.g., supplementary services, devices, etc.) to recommend to potential merchants based on merchant information and data model(s) 252, as described above. Furthermore, the user experience determination module 248 can determine how to order various elements of a graphical user interface, how to name particular products, etc. to enable a tailored experience for potential merchants. Moreover, the user experience determination module 248 can determine aspects of user experiences to modify such to streamline processes for setting up a merchant profile for a potential merchant that converts to a merchant (e.g., via a successful onboard). In additional and/or alternative examples, the user experience determination module 248 can determine educational information that can be presented as directives and/or with directives to assist potential merchants with the onboarding process.

In at least one example, the service computing device(s) 204 can include an instance of a training module 250. The training module 250 can be configured to train data model(s) 252 using machine learning mechanisms. In at least one example, the training module 250 can access training data. The training data can include descriptive data indicative of information about a plurality of potential merchants and onboarding data indicative of interactions with the service provider during an onboarding process for registering with the service provider. The descriptive data can correspond to merchant information, as described above. The onboarding data can indicate which directives were presented to a potential merchant, an order the directives were presented, a timing associated with when the directives were presented, a graphical presentation of the directives, etc. Further, the onboarding data can indicate which directives the potential merchant interacted with and context data associated with such interactions. In at least one example, the onboarding data can indicate which directives were presented to potential merchants immediately prior to the potential merchants withdrawing from the onboarding process. Accordingly, the training data can include merchant information associated with a potential merchant, interactions between the potential merchant and the service provider, and an indication whether the potential merchant successfully onboarded (e.g., was converted to a merchant). If a potential merchant was not converted to a merchant (e.g., the potential merchant withdrew from onboarding), the training data can also indicate one or more directives that were presented to the potential merchant prior to the withdrawal.

In additional and/or alternative examples, the training data can indicate intents of merchants. In some examples, the intents of the merchants can be determined based on statistical analyses of merchant information. For instance, the training module 250 can utilize techniques, such as k-means clustering, etc. to identify what characteristics are representative of merchants that use services offered by the service provider in particular ways. With that information, the training module 250 can identify how those merchants utilize the services offered by the service provider. Additionally and/or alternatively, such merchants can be surveyed or otherwise observed to determine how those merchants utilize the services offered by the service provider. Based on determining how particular merchants utilize services offered by the service provider, the intents of such merchants can be determined.

The training module 250 can train data model(s) 252 based on a plurality of training data items such that, given a new input of merchant information associated with a potential merchant, the data model(s) 252 can identify an intent of the potential merchant and/or a user experience for the potential merchant that is likely to lead to successfully onboarding the potential merchant (instead of a user experience that is likely to cause the potential merchant to withdraw from the onboarding process). In at least one example, the training module 250 can utilize a machine learning mechanism to train the data model(s) 252. In such an example, the data model(s) 252 can be trained using supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc. In at least one example, the training module 250 can receive updated training data and can iteratively update the data model(s) 252 based at least in part on the updated training data.

In at least one example, a data model of the data model(s) 252 can be trained based on training data associated with a plurality of potential merchants. That is, the data model(s) 252 can be particular to a general population of potential merchants. In additional and/or alternative examples, a data model of the data model(s) 252 can be trained based on training data associated with a plurality of potential merchants that share one or more characteristics (e.g., MCC, location, item(s) offered for sale, etc.). That is, the data model(s) 252 can be particular to a particular cohort of potential merchants that share one or more characteristics. Additional details associated with training the data model(s) are described below with respect to FIGS. 3 and 4.

Additional functional components stored in the computer-readable media 238 can include an operating system 254 for controlling and managing various functions of the service computing device(s) 204.

In at least one example, the computer-readable media 238 can include or maintain other functional components and data, such as other modules and data 256, which can include programs, drivers, etc., and the data used or generated by the functional components. Further, the service computing device(s) 204 can include many other logical, programmatic and physical components, of which those described above are merely examples that are related to the discussion herein.

In addition, the computer-readable media 238 can store data used for performing the operations described herein. Thus, the computer-readable media can store merchant profile(s) 258. In at least one example, the merchant profile(s) 258 can store merchant information associated with individual merchant(s) and/or potential merchant(s). As described above, merchant information can include, but is not limited to, a MCC, item(s) offered for sale by the merchant and/or potential merchant, transaction data associated with transactions conducted by the merchant and/or potential merchant, hardware (e.g., device type) used by the merchant and/or potential merchant, location data identifying location(s) associated with the merchant and/or potential merchant, employment data indicating whether the merchant and/or potential merchant employs employee(s) and/or identities of employee(s) employed by the merchant and/or potential merchant, etc. Furthermore, in some examples, a merchant profile can include context data and/or onboarding data associated with onboarding the potential merchant, as described above.

The communication interface(s) 240 can include one or more interfaces and hardware components for enabling communication with various other devices, such as over the network(s) 206. For example, communication interface(s) 240 can enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

The service computing device(s) 204 can further be equipped with various input/output (I/O) devices 242. Such I/O devices 242 can include a display, various user interface controls (e.g., buttons, joystick, keyboard, mouse, touch screen, etc.), audio speakers, connection ports and so forth.

As described above, in at least one example, the service computing device(s) 204 can communicate with third-party source(s) and/or system(s) 208. In at least one example, the third-party source(s) and/or system(s) 208 can include a website of the merchant, a social media platform, a reservation management platform, a menu management platform, an ecommerce platform, etc. Examples of social media platforms can include FACEBOOK®, LINKEDIN®, YELP®, FOURSQURE®, etc. Examples of reservation management platforms can include YELP® Reservations, OPENTABLE®, Flybook™, etc. Examples of menu management platforms include OPENMENU®, MENU-PAGES®, etc. Examples of ecommerce platforms include BIGCOMMERCE®, WEEBLY®, etc.

In at least one example, responsive to receiving a query associated with identification data of a potential merchant, the third-party source(s) and/or system(s) 208 can retrieve merchant information corresponding to the query. For instance, in an example where the query is associated with a business name, a third-party source and/or system 208 can retrieve information associated with a page corresponding to the business name (e.g., location(s), hours of operation, telephone number, email address, website, etc.). The third-party source(s) and/or system(s) 208 can retrieve merchant information and send the merchant information back to the service computing device(s) 204.

FIGS. 3-7 are flow diagrams illustrating example processes according to some implementations. The processes of FIGS. 3-7 are illustrated as collections of blocks in logical flow diagrams, which represent a sequence of operations, some or all of which can be implemented in hardware, software or a combination thereof. In the context of software, the blocks can represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. Further, in some examples, some or all of the operations illustrated in one or more of FIGS. 3-7 can be combined with some or all of the operations illustrated in others of FIGS. 3-7. For discussion purposes, the processes are described with reference to the environments, architectures and devices described in the examples herein, although the processes can be implemented in a wide variety of other environments, architectures and devices.

Various instructions, methods and techniques described herein can be considered in the general context of computer-executable instructions, such as program modules stored on computer-readable media, and executed by the processor(s) herein. Generally, program modules include routines, programs, objects, components, data structures, etc., for performing particular tasks or implementing particular abstract data types. These program modules, and the like, can be executed as native code or can be downloaded and executed, such as in a virtual machine or other just-in-time compilation execution environment. Typically, the functionality of the program modules can be combined or distributed as desired in various implementations. An implementation of these modules and techniques can be stored on computer storage media or transmitted across some form of communication media.

Figure 3:
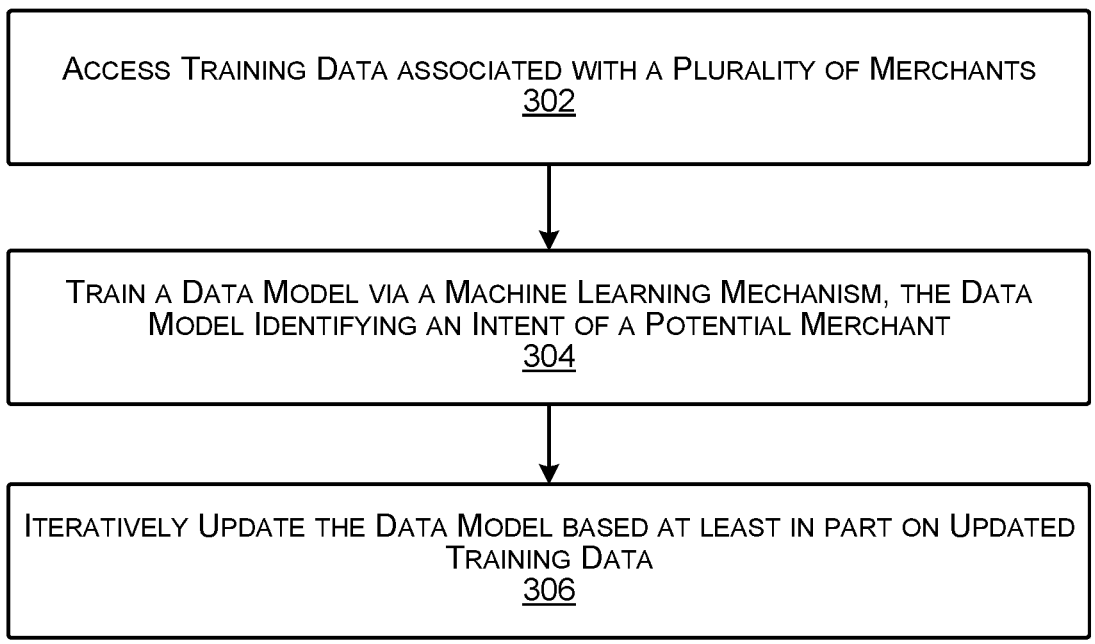
FIG. 3 is a flow diagram illustrating an example process for training a data model to determine an intent of a potential merchant according to some implementations.

FIG. 3 is a flow diagram illustrating an example process 300 for training a data model to determine an intent of a potential merchant according to some implementations. FIG. 3 is described in the context of the environment and/or device(s) described above with reference to FIG. 2, but is not limited to such environment and/or device(s).

Block 302 illustrates accessing training data associated with a plurality of merchants. As described above, the training module 250 can train one or more data models 252 leveraging machine learning mechanisms. In at least one example, the training module 250 can access training data. The training data can include merchant information associated with merchants, as described above. Furthermore, the training data can indicate intents of merchants. In some examples, the intents of merchants can be determined based on statistical analyses of merchant information. For instance, the training module 250 can utilize techniques, such as k-means clustering, etc. to identify what characteristics are representative of merchants that use services offered by the service provider in particular ways. With that information, the training module 250 can identify how those merchants utilize the services offered by the service provider. Additionally and/or alternatively, such merchants can be surveyed or otherwise observed to determine how those merchants utilize the services offered by the service provider. Based on determining how particular merchants utilize services offered by the service provider, the intents of such merchants can be determined. In at least one example, a training data item can include merchant data associated with a merchant and an intent determined for such merchant.

Block 304 illustrates training a data model via a machine learning mechanism, the data model identifying an intent of a potential merchant. The training module 250 can train a data model 252 based on a plurality of training data items such that, given a new input of merchant information associated with a potential merchant, the data model 252 can output an identification of an intent of the potential merchant. In at least one example, the training module 250 can utilize a machine learning mechanism to train the data model 252. In such an example, the data model can be trained using supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.

In some examples, the data model 252 can be trained on training data associated with a plurality of merchants that are registered and/or previously registered with the service provider. That is, such training data can be representative of a general population of merchants that are registered and/or previously registered with the service provider. In other examples, the data model 252 can be trained on training data associated with a plurality of merchants that are associated with a same characteristic (e.g., MCC, location(s), item(s) offered, etc.). That is, such training data can be representative of a cohort of merchants. Such a data model 252 can be more accurate for predicting intents of potential merchants that share the same characteristic than a data model 252 trained based on training data associated with the general population.

In at least one example, the data model 252 can be trained to output one or more intents and a confidence value associated with each of the one or more intents.

Block 306 illustrates iteratively updating the data model based at least in part on updated training data. In at least one example, the training module 250 can receive updated training data. For instance, training module 250 can receive updated training data after a lapse of a predetermined period of time, at a particular frequency, etc. The updated training data can include updated merchant information and updated information indicating how merchants are using services offered by the service provider. Furthermore, the updated training data can indicate whether a predicted intent previously output by the data model 252 was accurate (e.g., the merchant used the service(s) offered by the service provider in the way that was predicted). In at least one example, training module 250 can receive updated training data and can re-train the data model 252 based at least partly on the updated training data.

Figure 4:
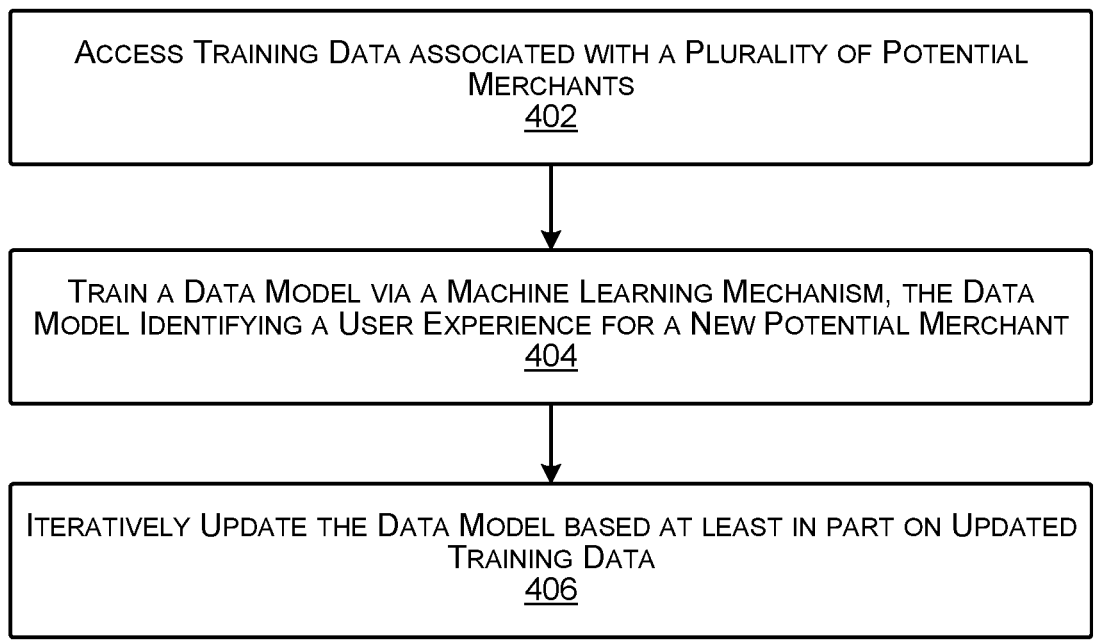
FIG. 4 is a flow diagram illustrating an example process for training a data model to determine a user experience for a potential merchant according to some implementations.

FIG. 4 is a flow diagram illustrating an example process 400 for training a data model to determine a user experience for a potential merchant according to some implementations. FIG. 4 is described in the context of the environment and/or device(s) described above with reference to FIG. 2, but is not limited to such environment and/or device(s).

Block 402 illustrates accessing training data associated with a plurality of potential merchants. As described above, the training module 250 can train one or more data models 252 leveraging machine learning mechanisms. In at least one example, the training module 250 can access training data. The training data can include descriptive data indicative of information about a plurality of potential merchants and onboarding data indicative of interactions between the plurality of potential merchants and the service provider during an onboarding process for registering with the service provider. The descriptive data can correspond to merchant information, as described above. In at least one example, the descriptive data can include an intent determined for the potential merchant. The onboarding data can indicate directives that were presented to a potential merchant, an order the directives were presented, a timing associated with when the directives were presented, a graphical presentation of the directives, etc. Further, the onboarding data can indicate which directives the potential merchant interacted with and context data associated with such interactions. In at least one example, the onboarding data can indicate which directives were presented to potential merchants immediately prior to the potential merchants withdrawing from the onboarding process. Accordingly, a training data item can include merchant information associated with a potential merchant (which can include an intent associated with the potential merchant), interactions between the potential merchant and the service provider, and an indication whether the potential merchant successfully onboarded (e.g., was converted to a merchant). If a potential merchant was not converted to a merchant (e.g., the potential merchant withdrew from onboarding), the training data item can also indicate one or more directives that were presented to the potential merchant prior to the withdrawal.

In at least one example, training data can be processed to identify trends. For instance, the training module 250 can process the training data to determine one or more directives that resulted in one or more potential merchants successfully completing an onboarding process. Additionally and/or alternatively, the training module 250 can process the training data to determine one or more directives that resulted in one or more potential merchants withdrawing from the onboarding process. Directives can be labeled with indications of such. Furthermore, the training module 250 can process the training data to determine orders of directives, timings of directives, graphical presentations of directives, etc. that that resulted in one or more potential merchants successfully completing an onboarding process or that resulted in one or more potential merchants withdrawing from an onboarding process.

Block 404 illustrates training a data model via a machine learning mechanism, the data model identifying a user experience for a new potential merchant. The training module 250 can train a data model 252 based on a plurality of training data items such that, given a new input of merchant information associated with a potential merchant, the data model 252 can output an identification of a user experience for a new potential merchant. In at least one example, the training module 250 can utilize a machine learning mechanism to train the data model 252. In such an example, the data model can be trained using supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.

In some examples, the data model 252 can be trained on training data associated with a plurality of potential merchants that participated in an onboarding process for onboarding with the service provider. That is, such training data can be representative of a general population of potential merchants that participated in an onboarding process for onboarding with the service provider. In other examples, the data model 252 can be trained on training data associated with a plurality of potential merchants that are associated with a same characteristic (e.g., MCC, location(s), item(s) offered, etc.). That is, such training data can be representative of a cohort of potential merchants that participated in an onboarding process for onboarding with the service provider. Such a data model 252 can be more accurate for predicting intents of potential merchants that share the same characteristic than a data model 252 trained based on training data associated with the general population.

In at least one example, the data model 252 can be trained to output a user experience. In some examples, the user experience can be used to determine one or more directives that are to be presented to the potential merchant, an order for presenting the one or more directives, a timing for presenting the one or more directives, a graphical presentation for presenting the one or more directives, etc. That is, the data model 252 can be trained to output a user experience that is particular to merchant information associated with a potential merchant. As described above, this enables a more relevant onboarding process for potential merchants to reduce friction and/or time consumed onboarding onto the service provider, thereby enabling potential merchants to meaningfully interact with the service provider earlier than what is possible with existing onboarding techniques.

Block 406 illustrates iteratively updating the data model based at least in part on updated training data. In at least one example, the training module 250 can receive updated training data. For instance, training module 250 can receive updated training data after a lapse of a predetermined period of time, at a particular frequency, etc. The updated training data can include updated descriptive data and/or onboarding data. Furthermore, the updated training data can indicate whether user experiences output by the data model 252 were successful in converting potential merchants to merchants and reducing the number of potential merchants that withdrew from the onboarding process. In at least one example, training module 250 can receive updated training data and can re-train the data model based at least partly on the updated training data.

Figure 5:
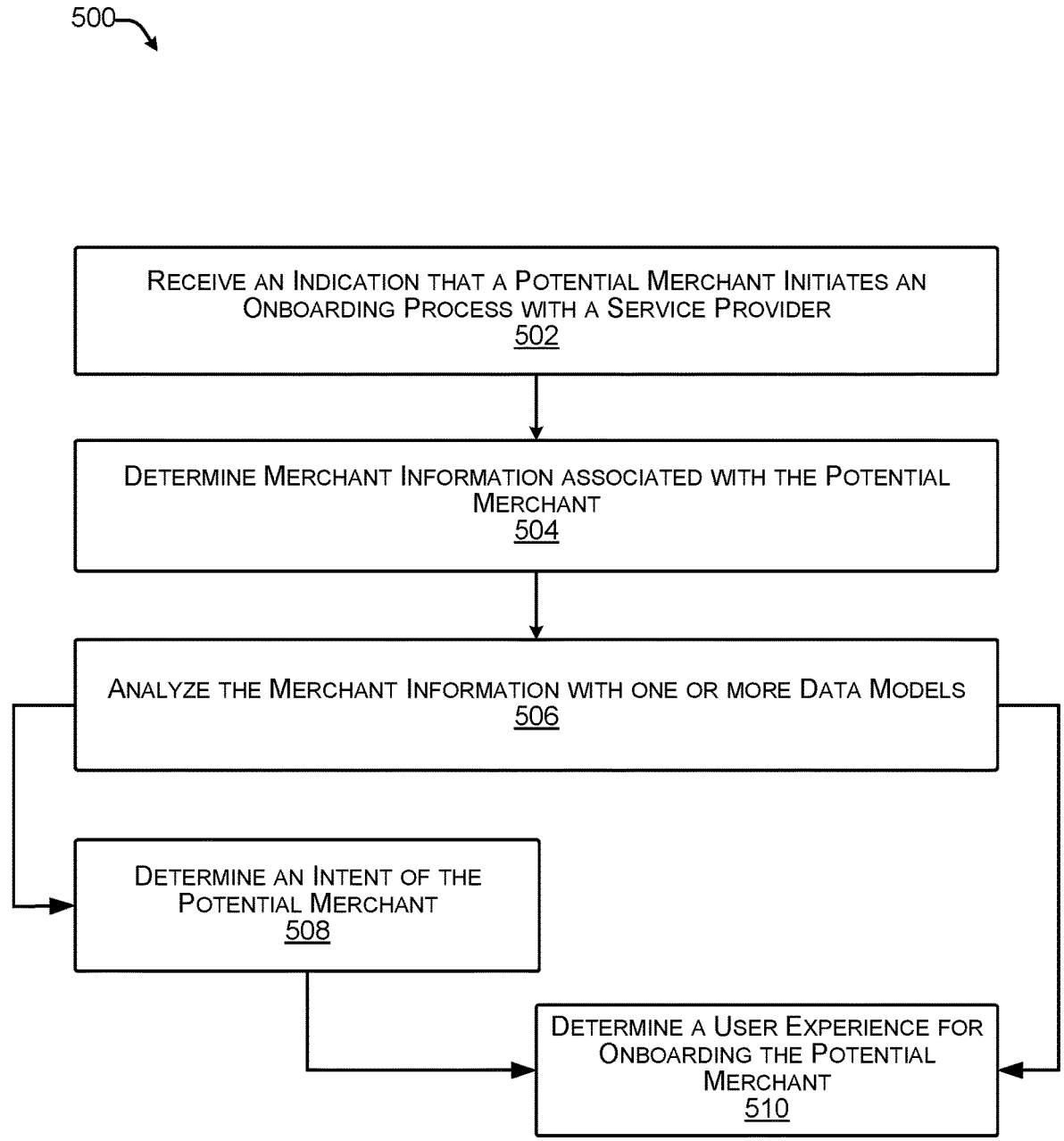
FIG. 5 is a flow diagram illustrating an example process for determining a user experience for a potential merchant according to some implementations.

FIG. 5 is a flow diagram illustrating an example process 500 for determining a user experience for a potential merchant according to some implementations. FIG. 5 is described in the context of the environment and/or device(s) described above with reference to FIG. 2, but is not limited to such environment and/or device(s).

Block 502 illustrates receiving an indication that a potential merchant initiates an onboarding process with a service provider. In at least one example, the onboarding module 244 can receive an indication that a potential merchant initiates an onboarding process. In at least one example, the indication can correspond to identification data. The identification data can include one or more of a business name of a potential merchant, a phone number of a potential merchant, an email address of a potential merchant, a logo of a potential merchant, etc. In some examples, the indication can be received responsive to a directive presented via the UI to manage the onboarding process 217.

Block 504 illustrates determining merchant information associated with the potential merchant. In at least one example, the merchant information determination module 246 can be configured to utilize the identification data to access merchant information associated with the potential merchant. For instance, the merchant information determination module 246 can send a query to the third-party source(s) and/or system(s) 208. The query can include at least some identification data. Based at least in part on sending the query to the third-party source(s) and/or system(s) 208, the third-party source(s) and/or system(s) 208 can send merchant information associated with the identification data back to the merchant information determination module 246.

In some examples, the merchant information determination module 246 can send a query to the merchant computing device(s) 202 from which the merchant determination module 246 received the indication. The query can include a request for device-specific merchant information. For instance, such merchant information can include location data as determined by the GPS device 232, device identification information, hardware information, software versions running on the merchant computing device, etc. Based at least in part on sending the query to the merchant computing device(s) 202, the merchant computing device(s) 202 can send merchant information back to the merchant information determination module 246.

In at least one example, merchant information can be associated with the indication. For instance, in some examples, the indication can include data identifying a computing location from which the potential merchant accessed the UI to manage the onboarding process 217. As a non-limiting example, the indication can include data identifying a search engine results page as the computing location from which the potential merchant accessed the UI to manage the onboarding process 217, or the indication can include data identifying a website associated with the service provider from which the potential merchant accessed the UI to manage the onboarding process 217. Additionally and/or alternatively, the indication can include data identifying a device (e.g., mobile, desktop, etc.) from which the indication was generated and/or an access point (e.g., web browser, application, etc.) from which the indication was generated.

Block 506 illustrates analyzing the merchant information with one or more data models. As described above, the experience determination module 248 can be configured to intelligently determine user experiences for onboarding potential merchants. In at least one example, the experience determination module 248 can access merchant information associated with a particular potential merchant and can leverage the data model(s) 252 to analyze the merchant information.

Block 508 illustrates determining an intent of the potential merchant. In some examples, the experience determination module 248 can utilize a first data model 252 trained to identify an intent of a potential merchant based on the merchant information. In such examples, the experience determination module 248 can analyze the merchant information using the first data model 252 to determine an intent of the potential merchant. The intent can indicate an intended use of services offered by a service provider by the potential merchant.

In some examples, the experience determination module 248 can analyze the merchant information to determine which data model(s) 252 to use for analyzing the merchant information. For instance, in at least one example, the experience determination module 248 can identify at least one characteristic that is shared between the potential merchant and one or more other merchants, and can determine to use a data model 252 corresponding to a data model 252 that was trained on training data associated with the one or more other merchants. That is, based at least in part on determining that a potential merchant shares one or more characteristics with a cohort of merchants, a data model 252 trained on training data from the cohort of merchants can be used for determining the intent of the potential merchant.

Block 510 illustrates determining a user experience for onboarding the potential merchant. In at least one example, the experience determination module 248 can utilize a second data model 252 to determine a user experience for onboarding the potential merchant. In some examples, the experience determination module 248 can analyze the merchant information and an intent output by the first data model 252. In other examples, the experience determination module 248 can analyze the merchant information without receiving an intent that was determined by the first data model 252. That is, in some examples, the experience determination module 248 can optionally utilize the first data model 252 to determine the intent of the potential merchant, and in examples where the experience determination module 248 does not first determine the intent of the potential merchant, process 500 can proceed directly from block 506 to 510.

In some examples, the experience determination module 248 can analyze the merchant information to determine which data model(s) 252 to use for analyzing the merchant information. For instance, in at least one example, the experience determination module 248 can identify at least one characteristic that is shared between the potential merchant and one or more other potential merchants, and can determine to use a data model 252 corresponding to a data model 252 that was trained on training data associated with the one or more other potential merchants. That is, based at least in part on determining that a potential merchant shares one or more characteristics with a cohort of potential merchants, a data model 252 trained on training data from the cohort of potential merchants can be used for determining the user experience for the potential merchant.

Based at least in part on analyzing the merchant information, the data model(s) 252 can identify a user experience for onboarding the particular potential merchant. As described above, the user experience can identify one or more directives that are to be presented to the potential merchant, an order for presenting the one or more directives, a timing for presenting the one or more directives, a graphical presentation for presenting the one or more directives, etc. In at least one example, the user experience can cause directives that are likely to lead to a successful onboard to be presented before directives that are likely to cause potential merchants to withdraw from the onboarding process. That is, the user experience determination module 248 can cause directives that are most relevant to the potential merchant's intended use of service(s) offered by the service provider to be presented prior to directives that are less relevant to the potential merchant's intended use of service(s). Accordingly, potential merchants can provide information that is necessary to access particular service(s) without having to provide information that is not necessary to obtain prior to onboarding. Furthermore, in at least one example, particular user experiences can cause directives to be presented with particular graphical presentations that are relevant, or of particular interest, to a particular potential merchant.

In some examples, the user experience determination module 248 can dynamically modify and/or update the user experience during the onboarding process, as described with respect to FIG. 6, below.

Figure 6:
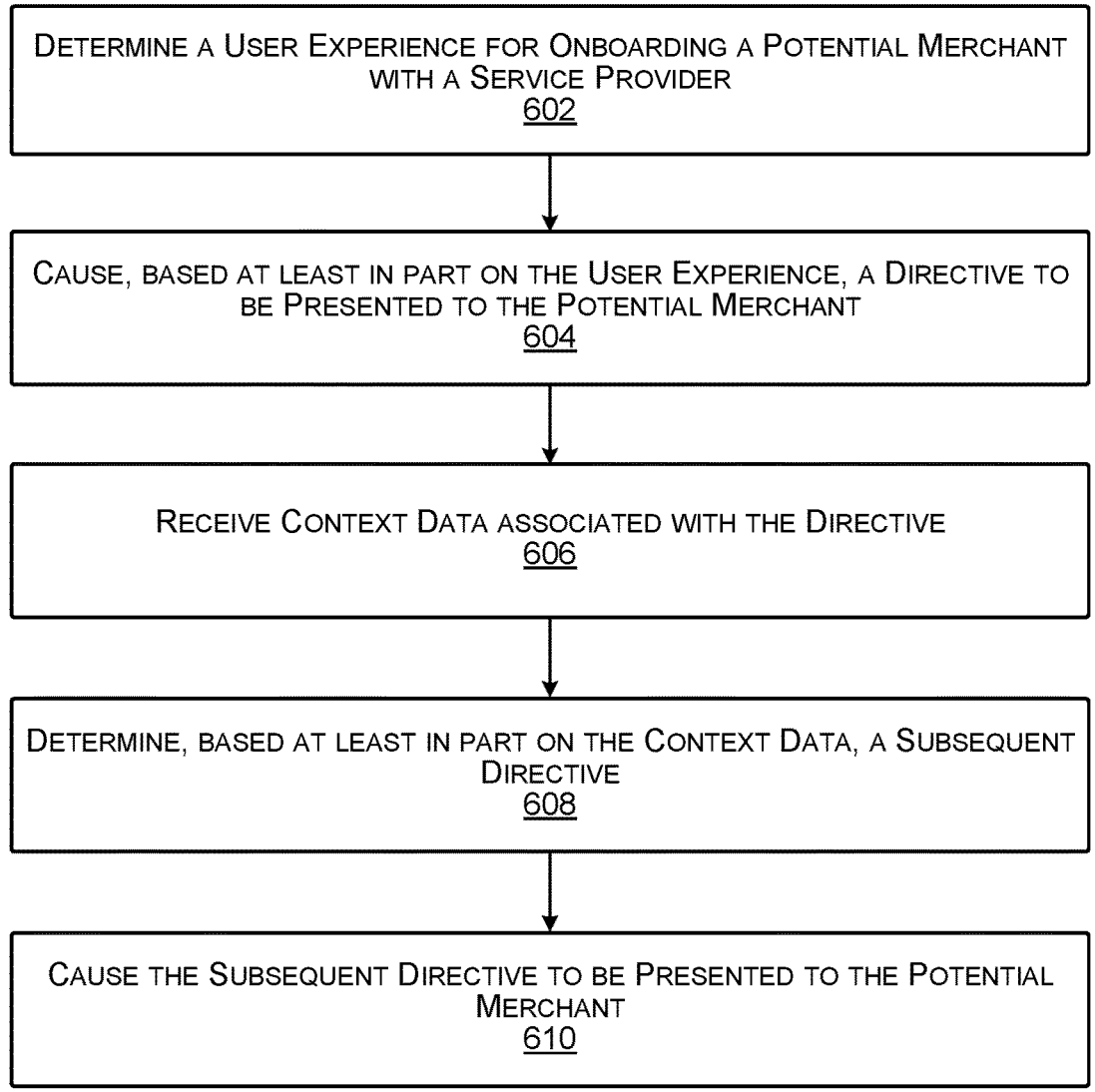
FIG. 6 is a flow diagram illustrating an example process for dynamically modifying a user experience for a potential merchant according to some implementations.

FIG. 6 is a flow diagram illustrating an example process for dynamically modifying a user experience for a potential merchant according to some implementations. FIG. 6 is described in the context of the environment and/or device(s) described above with reference to FIG. 2, but is not limited to such environment and/or device(s).

Block 602 illustrates determining a user experience for onboarding a potential merchant with a service provider. Additional details associated with determining a user experience for a potential merchant are described above with respect to FIG. 5.

Block 604 illustrates causing, based at least in part on the user experience, a directive to be presented to the potential merchant. In at least one example, the user experience determination module 248 can identify a directive to provide to a potential merchant based on the user experience determined for the potential merchant. The directive can have been previously determined to be likely to lead to a successful onboarding in view of the merchant information associated with the potential merchant. That is, the directive can have been previously presented to one or more potential merchants that successfully completed the onboarding process. The user experience determination module 248 can send an instruction to a merchant computing device 202 and a UI to manage the onboarding process 217 associated with the merchant computing device 202 can present the directive (e.g., via a display 228 etc.) to the potential merchant.

In some examples, as described above, at least a portion of information included in a directive can be automatically populated based on merchant information retrieved by the merchant information determination module 246.

Block 606 illustrates receiving context data associated with the directive. The user experience determination module 248 can receive context data indicating how the potential merchant responded and/or interacted with the first directive. For instance, the UI to manage the onboarding process 217 associated with the merchant computing device 202 can determine that the potential merchant did not interact with the directive for a particular duration of time (e.g., indicating that the potential merchant was confused or hesitated to provide requested information), that the potential merchant attempted to pass on interacting with the directive, etc. Or, the UI to manage the onboarding process 217 can track interactions with the UI (e.g., clicks, taps, etc.) and/or page views and can generate context data based on such information. In such examples, the UI to manage the onboarding process 217 can send context data to the service computing device(s) 204.

Block 608 illustrates determining, based at least in part on the context data, a subsequent directive. Based at least in part on the context data, the user experience determination module 248 can determine a subsequent directive to present to the potential merchant. In at least one example, the experience determination module 248 can analyze the merchant information and context data utilizing one or more data models 252 to determine a subsequent directive that is to be presented to the potential merchant.

Block 610 illustrates causing the subsequent directive to be presented to the potential merchant. In at least one example, the user experience determination module 248 can identify a subsequent directive to provide to a potential merchant based on the user experience determined for the potential merchant. The subsequent directive can have been previously determined to be likely to lead to a successful onboarding in view of the merchant information associated with the potential merchant and context data generated from interaction between the potential merchant and the previous directive. The user experience determination module 248 can send an instruction to a merchant computing device 202 and a UI to manage the onboarding process 217 associated with the merchant computing device 202 can present the subsequent directive (e.g., via a display 228, etc.) to the potential merchant.

Process 600 can repeat at least until a potential merchant has onboarded with the service provider (e.g., converted to a merchant). In such examples, the user experience determination module 248 can provide various customizations to enable a tailored experience for a potential merchant that has converted to a merchant. For instance, the user experience determination module 248 can determine products (e.g., supplementary services, devices, etc.) to recommend to a merchant based on merchant information and data models) 252, as described above. Furthermore, the user experience determination module 248 can determine how to order various elements of a graphical user interface, how to name particular products, etc. to enable a tailored experience for the merchant. Moreover, the user experience determination module 248 can determine aspects of user experiences to modify such to streamline processes for setting up a merchant profile for the merchant (e.g., via a successful onboard). In additional and/or alternative examples, the user experience determination module 248 can determine educational information that can be presented as directives and/or with directives to assist the merchant with additional set-up, etc.

Figure 7:
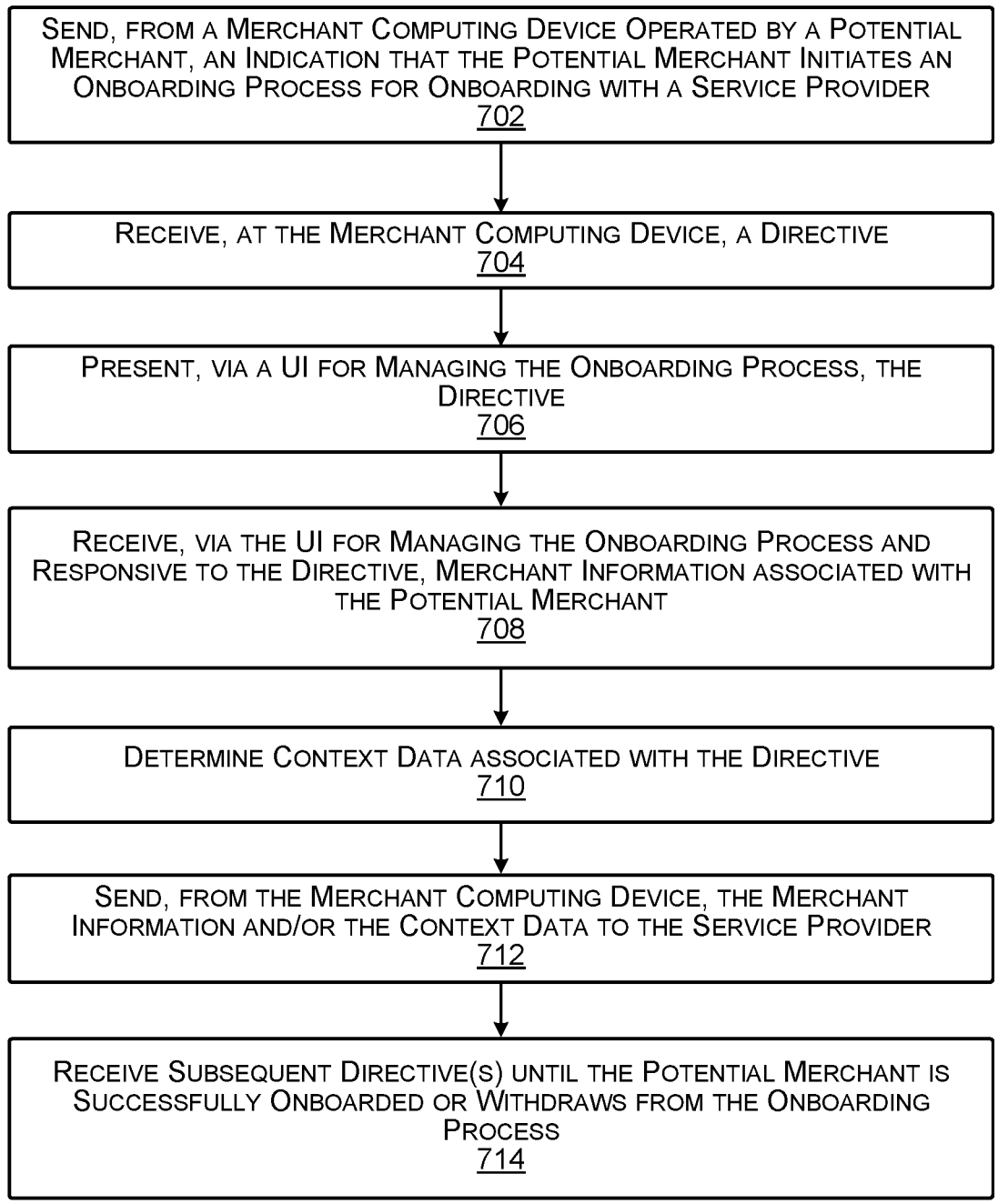
FIG. 7 is a flow diagram illustrating an example process for managing an onboarding process for onboarding a potential merchant according to some implementations.

FIG. 7 is a flow diagram illustrating an example process 700 for managing an onboarding process for onboarding a potential merchant according to some implementations.

FIG. 7 is described in the context of the environment and/or device(s) described above with reference to FIG. 2, but is not limited to such environment and/or device(s).

Block 702 illustrates sending, from a merchant computing device operated by a potential merchant, an indication that the potential merchant initiates an onboarding process for onboarding with a service provider. As described above with reference to FIG. 2, the merchant computing device(s) 202 can include an instance of a UI to manage the onboarding process 217. In at least one example, the UI to manage the onboarding process 217 can be presented via a web browser, or the like, that enables a prospective merchant to access and manage an onboarding process. In other examples, the UI to manage the onboarding process 217 can be presented via an application, such as a mobile application or desktop application, which is provided by the service provider, or which can be an otherwise dedicated application.

In at least one example, a potential merchant can interact with the UI to manage the onboarding process 217. Responsive to such an interaction, the UI to manage the onboarding process 217 can send an indication to the service provider. The indication can inform the service provider that a potential merchant has initiated an onboarding process. In some examples, the UI to manage the onboarding process 217 can present a directive (e.g., a default directive) to solicit identification associated with the potential merchant. For instance, in at least one example, the UI to manage the onboarding process 217 can prompt the potential merchant for identification data (e.g., potential merchant to provide a business name, a business address, a website for a business, an email address associated with a business, a logo used to identify a business, etc.). In such examples, the UI to manage the onboarding process 217 can send the identification data to the service computing device(s) 204 with the indication.

Additionally, in some examples, the indication that the potential merchant initiates an onboarding process can be associated with merchant information. For instance, in some examples, the indication can include data identifying a computing location from which the potential merchant accessed the UI to manage the onboarding process 217. As a non-limiting example, the indication can include data identifying a search engine results page as the computing location from which the potential merchant accessed the UI to manage the onboarding process 217, or the indication can include data identifying a website associated with the service provider from which the potential merchant accessed the UI to manage the onboarding process 217. Additionally and/or alternatively, the indication can include data identifying a device (e.g., mobile, desktop, etc.) from which the indication was generated and/or an access point (e.g., web browser, application, etc.) from which the indication was generated.

Block 704 illustrates receiving, at the merchant computing device, a directive. In at least one example, the UI to manage the onboarding process 217 can present graphical user interface(s) that prompt a potential merchant to input information that can be used to register the potential merchant with the service provider. For instance, as described herein, the service computing device(s) 204 can determine user experiences that are tailored for particular potential merchants. In at least one example, the service computing device(s) 204 can send instructions to the UI to manage the onboarding process 217. The instructions can identify one or more directives (e.g., questions, prompts, etc.) that are to be presented to a potential merchant, an order for presenting the directive(s), a timing for presenting the directive(s), and/or a graphical design for presenting the directive(s). The UI to manage the onboarding process 217 can implement the instructions for providing a personalized user experience to a potential merchant.

Block 706 illustrates presenting, via a UI for managing the onboarding process, the directive. In at least one example, the UI to manage the onboarding process 217 can implement the instructions for providing a personalized user experience to a potential merchant. In at least one example, the UI to manage the onboarding process 217 can present a directive based on the instructions received from the service computing device(s) 204. In some examples, the directive can be at least partially populated with information retrieved by the service provider.

Block 708 illustrates receiving, via the UI for managing the onboarding process and responsive to the directive, merchant information associated with the potential merchant. As described above, a directive can include a question, a prompt, etc. that can solicit information from a potential merchant. In at least one example, a directive can solicit account information identifying an account where the potential merchant desires to have funds deposited for payments processed by the service provider. Or, a directive can solicit inventory information identifying item(s) that the potential merchant has in its inventory. In at least one example, the UI to manage the onboarding process 217 can receive the merchant information input by the potential merchant. In some examples, the UI to manage the onboarding process 217 can receive a confirmation of merchant information that was populated by the service provider.

Block 710 illustrates determining context data associated with the directive. The UI to manage the onboarding process 217 can determine context data associated with how the potential merchant interacts with the directive. For instance, the UI to manage the onboarding process 217 can determine that the potential merchant did not interact with the directive for a particular duration of time (e.g., indicating that the potential merchant was confused or hesitated to provide requested information), that the potential merchant attempted to pass on interacting with the directive, etc. Or, the UI to manage the onboarding process 217 can track interactions with the UI (e.g., clicks, taps, etc.) and/or page views and can generate context data based on such information.

Block 712 illustrates sending, from the merchant computing device, the merchant information and/or the context data to the service provider. In at least one example, the UI to manage the onboarding process 217 can send merchant information received responsive to the directive and/or the context data to the service computing device(s) 204.

Block 714 illustrates receiving subsequent directive(s) until the potential merchant is successfully onboarded or withdraws from the onboarding process. In at least one example, responsive to the UI to manage the onboarding process 217 sending merchant information and/or context data to the service computing device(s) 204, the service computing device(s) 204 can leverage the context data for intelligently selecting a subsequent directive that is to be presented to the potential merchant, as described above with reference to FIG. 6. The service computing device(s) 204 can send subsequent directive(s) until the potential merchant is successfully onboarded (as a merchant) and/or the potential merchant withdraws from the onboarding process. As described above, a potential merchant can successfully onboard by registering with the service provider. In at least one example, a potential merchant can be determined to have withdrawn from the onboarding process due to inactivity with the UI to manage the onboarding process 217 for more than a threshold period of time, an express indication of withdrawal, etc.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A system comprising:
   one or more processors; and
   one or more non-transitory computer-readable media storing instructions that, when executed by the one or more processors, cause the one or more processors to:
     cause, in association with an onboarding process for one or more services of a service provider, directives to be presented via instances of a user interface associated with the service provider to potential merchants;
     determine, by a machine learning (ML) data model, first information associated with a first set of the directives that is presented to a first portion of the potential merchants that completed the onboarding process, based on prior completed onboarding interactions with the service provider;
     determine, by the ML data model, second information associated with a second set of the directives that is presented to a second portion of the potential merchants that did not complete the onboarding process, based on prior incomplete onboarding interactions with the service provider;
     train the ML data model to identify trends in regards to the first information and the second information;
     receive a first indication that a first potential merchant initiates the onboarding process;
     receive, from a third-party system associated with the first potential merchant, merchant information associated with the first potential merchant;
     determine, based at least in part on the ML data model and the merchant information, first directives that are to be presented to the first potential merchant;
     cause a first directive of the first directives to be presented via an instance of the user interface and on a computing device operable by the first potential merchant;
     receive, from the computing device, a second indication of an interaction between the first potential merchant and the instance of the user interface presenting the first directive;
     determine context data based at least in part on receiving the second indication, wherein the context data indicates one or more of (i) a duration of time between when the first directive was presented and the second indication is received, (ii) one or more interactions with the user interface while the first directive was presented, or (iii) an indication of page views while the first directive was presented;
     determine, based at least in part on the ML data model and the context data, a second directive of the first directives to present to the first potential merchant; and
     cause the second directive to be presented via the instance of the user interface on the computing device.

2. The system as claim 1 recites, wherein the indication comprises identification data identifying the first potential merchant, and the instructions further program the processors to perform, based at least in part on the identification data, a search to obtain, from third-party information sources, the merchant information associated with the first potential merchant.

3. The system as claim 1 recites, wherein the merchant information associated with the first potential merchant includes at least one of a merchant category associated with the first potential merchant, items offered by the first potential merchant, an indication of whether employees are employed by the first potential merchant, or a location of the first potential merchant.

4. The system as claim 1 recites, wherein the instructions, when executed by the one or more processors, cause the one or more processors further to utilize the merchant information associated with the first potential merchant to auto-populate at least one request for information associated with the onboarding process.

5. The system as claim 1 recites, wherein the instructions, when executed by the one or more processors, cause the one or more processors further to:
   access training data, the training data including (i) descriptive data that indicates identification information about the potential merchants and (ii) onboarding data that indicates interactions with the service provider during the onboarding process of the potential merchants; and
   train, via a machine-learning mechanism, the data model based at least in part on one or more trends associated with the onboarding process represented by the descriptive data and the onboarding data.

6. The system as claim 5 recites, wherein the instructions, when executed by the one or more processors, cause the one or more processors further to:
   receive updated training data indicating updated onboarding data; and
   update the data model based at least in part on the updated training data.

7. The system as claim 1 recites, wherein the instructions, when executed by the one or more processors, cause the one or more processors further to determine at least one of an order for presenting the first directives, a timing for presenting the first directives, or a graphical presentation for presenting the first directives.

8. The system as claim 1 recites, wherein the instructions, when executed by the one or more processors, cause the one or more processors further to:
   receive an additional indication that a second potential merchant initiates the onboarding process;
   determine that the second potential merchant has an intent for interacting with the service provider that is different than the first potential merchant; and
   determine, based at least in part on the data model and the intent of the second potential merchant, at least one of (i) second directives to present to the second potential merchant or (ii) a different order that the first directives are to be presented to the second potential merchant.

9. The system as claim 1 recites, wherein the instructions, when executed by the one or more processors, cause the one or more processors further to:
   access, from a database storing merchant profiles of a plurality of merchants associated with the service provider, data associated with the plurality of merchants;

identify, based at least in part on the data and the merchant information, one or more merchants of the plurality of merchants that are similar to the first potential merchant;
access additional merchant information based at least in part on identifying the one or more merchants that are similar to the first potential merchant; and
determine the first directives further based at least in part on the additional merchant information.

10. The system as claim 1 recites, wherein the instructions, when executed by the one or more processors, cause the one or more processors further to:
determine that the first potential merchant completed the onboarding process;
determine, based at least in part on the merchant information, a recommendation associated with at least one of a service or a device of the service provider; and
send the recommendation to the computing device.

11. One or more non-transitory computer-readable media storing instructions executable by one or more processors, wherein the instructions, when executed by the one or more processors, cause the one or more processors to:
cause, in association with an onboarding process for one or more services of a service provider, directives to be presented via instances of a user interface associated with the service provider to potential merchants;
determine, by a machine learning (ML) data model, first information associated with a first set of the directives that is presented to a first portion of the potential merchants that completed the onboarding process, based on prior completed onboarding interactions with the service provider;
determine, by the ML data model, second information associated with a second set of the directives that is presented to a second portion of the potential merchants that did not complete the onboarding process, based on prior incomplete onboarding interactions with the service provider;
train the ML data model to identify trends in regards to the first information and the second information;
receive a first indication that a first potential merchant initiates the onboarding process;
receive, from a third-party system associated with the first potential merchant, merchant information associated with the first potential merchant;
determine, based at least in part on the ML data model and the merchant information, first directives that are to be presented to the first potential merchant;
cause a first directive of the first directives to be presented via an instance of the user interface and on a computing device operable by the first potential merchant;
receive, from the computing device, a second indication of an interaction between the first potential merchant and the instance of the user interface presenting the first directive of the first directives;
determine context data based at least in part on receiving the second indication, wherein the context data indicates one or more of (i) a duration of time between when the first directive was presented and the second indication is received, (ii) one or more interactions with the user interface while the first directive was presented, or (iii) an indication of page views while the first directive was presented;
determine, based at least in part on the ML data model and the context data, a second directive of the first directives to present to the first potential merchant; and
cause the second directive to be presented via the instance of the user interface on the computing device.

12. The one or more non-transitory computer-readable media as claim 11 recites,
wherein the indication comprises identification data identifying the first potential merchant, and the instructions further program the processors to perform, based at least in part on the identification data, a search to obtain, from third-party information sources, the merchant information associated with the first potential merchant, and
wherein the merchant information associated with the first potential merchant includes at least one of a merchant category associated with the first potential merchant, items offered by the first potential merchant, an indication of whether employees are employed by the first potential merchant, or a location of the first potential merchant.

13. The one or more non-transitory computer-readable media as claim 11 recites, wherein the instructions, when executed by the one or more processors, cause the one or more processors further to:
receive an additional indication that a second potential merchant initiates the onboarding process;
determine that the second potential merchant has an intent for interacting with the service provider that is different than the first potential merchant; and
determine, based at least in part on the data model and the intent of the second potential merchant, at least one of (i) second directives to present to the second potential merchant or (ii) a different order that the first directives are to be presented to the second potential merchant.

14. The one or more non-transitory computer-readable media as claim 11 recites, wherein the instructions, when executed by the one or more processors, cause the one or more processors further to determine at least one of an order for presenting the first directives, a timing for presenting the first directives, or a graphical presentation for presenting the first directives.

15. The one or more non-transitory computer-readable media as claim 11 recites, wherein the instructions, when executed by the one or more processors, cause the one or more processors further to:
access, from a database storing merchant profiles of a plurality of merchants associated with the service provider, data associated with the plurality of merchants;
identify, based at least in part on the data and the merchant information, one or more merchants of the plurality of merchants that are similar to the first potential merchant;
access additional merchant information based at least in part on identifying the one or more merchants that are similar to the first potential merchant; and
determine the first directives further based at least in part on the additional merchant information.

16. A computer-implemented method comprising:
causing, in association with an onboarding process for one or more services of a service provider, directives to be presented via instances of a user interface associated with the service provider to potential merchants;
determining, by a machine learning (ML) data model, first information associated with a first set of the directives that is presented to a first portion of the potential merchants that completed the onboarding process, based on prior completed onboarding interactions with the service provider;

determining, by the ML data model, second information associated with a second set of the directives that is presented to a second portion of the potential merchants that did not complete the onboarding process, based on prior incomplete onboarding interactions with the service provider;

training the ML data model to identify trends in regards to the first information and the second information;

receiving a first indication that a first potential merchant initiates the onboarding process;

receiving, from a third-party system associated with the first potential merchant, merchant information associated with the first potential merchant;

determining, based at least in part on the ML data model and the merchant information, first directives that are to be presented to the first potential merchant;

causing a first directive of the first directives to be presented via an instance of the user interface and on a computing device operable by the first potential merchant;

receiving, from the computing device, a second indication of an interaction between the first potential merchant and the instance of the user interface presenting the first directive of the first directives;

determining context data based at least in part on receiving the second indication, wherein the context data indicates one or more of (i) a duration of time between when the first directive was presented and the second indication is received, (ii) one or more interactions with the user interface while the first directive was presented, or (iii) an indication of page views while the first directive was presented;

determining, based at least in part on the ML data model and the context data, a second directive of the first directives to present to the first potential merchant; and causing the second directive to be presented via the instance of the user interface on the computing device.

17. The computer-implemented method as claim 16 recites, further comprising:
receiving an additional indication that a second potential merchant initiates the onboarding process;
determining that the second potential merchant has an intent for interacting with the service provider that is different than the first potential merchant; and
determining, based at least in part on the data model and the intent of the second potential merchant, at least one of (i) second directives to present to the second potential merchant or (ii) a different order that the first directives are to be presented to the second potential merchant.

18. The computer-implemented method as claim 16 recites, further comprising determining at least one of an order for presenting the first directives, a timing for presenting the first directives, or a graphical presentation for presenting the first directives.

19. The computer-implemented method as claim 16 recites, further comprising:
accessing, from a database storing merchant profiles of a plurality of merchants associated with the service provider, data associated with the plurality of merchants;
identifying, based at least in part on the data and the merchant information, one or more merchants that are similar to the first potential merchant;
accessing additional merchant information based at least in part on identifying the one or more merchants of the plurality of merchants that are similar to the first potential merchant; and
determining the first directives further based at least in part on the additional merchant information.

20. The computer-implemented method as claim 16 recites, further comprising:
determining that the first potential merchant completed the onboarding process;
determining, based at least in part on the merchant information, a recommendation associated with at least one of a service or a device of the service provider; and
sending the recommendation to the computing device.

* * * * *